United States Patent
Ford

(10) Patent No.: US 8,960,948 B2
(45) Date of Patent: Feb. 24, 2015

(54) COLLAR MOUNT AND LIGHT

(71) Applicant: The Flewelling Ford Family Trust, Beaconsfield (CA)

(72) Inventor: Timothy D. F. Ford, Beaconsfield (CA)

(73) Assignee: The Flewelling Ford Family Trust, Beaconsfield (CA)

( * ) Notice: Subject to any disclaimer, the term of this patent is extended or adjusted under 35 U.S.C. 154(b) by 146 days.

(21) Appl. No.: 13/852,508

(22) Filed: Mar. 28, 2013

(65) Prior Publication Data

US 2013/0258686 A1 Oct. 3, 2013

Related U.S. Application Data

(60) Provisional application No. 61/617,761, filed on Mar. 30, 2012.

(51) Int. Cl.
| | | |
|---|---|---|
| *F21L 4/00* | (2006.01) |
| *F21V 19/02* | (2006.01) |
| *F21V 21/088* | (2006.01) |
| *A01K 27/00* | (2006.01) |
| *F21V 3/04* | (2006.01) |
| *F21V 5/04* | (2006.01) |
| *F21V 17/12* | (2006.01) |
| *F21V 23/04* | (2006.01) |
| *F21Y 101/02* | (2006.01) |

(52) U.S. Cl.
CPC .............. *F21V 19/02* (2013.01); *F21V 21/0885* (2013.01); *A01K 27/006* (2013.01); *F21V 3/0436* (2013.01); *F21V 5/04* (2013.01); *F21V 17/12* (2013.01); *F21V 23/0414* (2013.01); *F21Y 2101/02* (2013.01)
USPC ........... 362/190; 362/191; 362/103; 362/108; 362/396; 248/603

(58) Field of Classification Search
USPC ................. 362/190–191, 396, 103, 108, 288; 248/603–604
See application file for complete search history.

(56) References Cited

U.S. PATENT DOCUMENTS 6,224,235 B1 * 5/2001 Parker ........................... 362/190
6,805,460 B1 * 10/2004 Zoller et al. ................... 362/103

* cited by examiner

*Primary Examiner* — Robert May
(74) *Attorney, Agent, or Firm* — Goudreau Gage Dubuc; Hugh Mansfield

(57) ABSTRACT

A light and associated mounting body is disclosed which is suitable for mounting on straps of different widths. In a particular embodiment the body can be mounted to the strap, for example a collar or the like, without removing the collar from the object it is attached to.

10 Claims, 7 Drawing Sheets

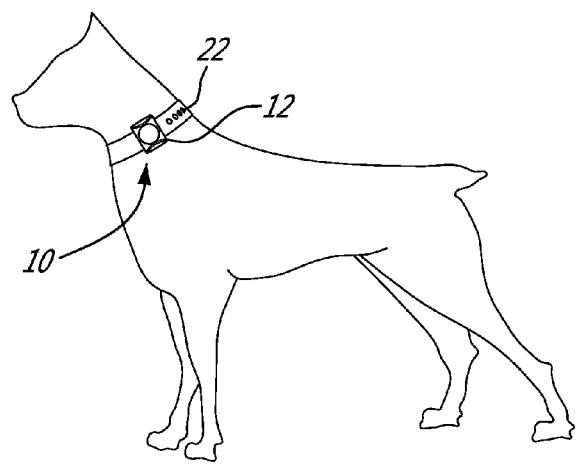
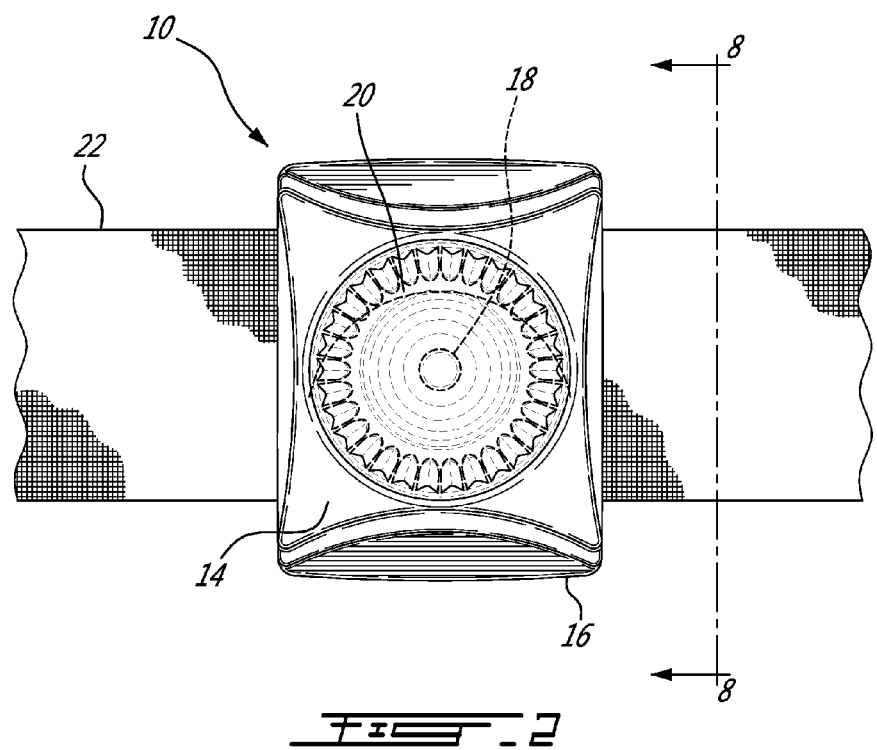

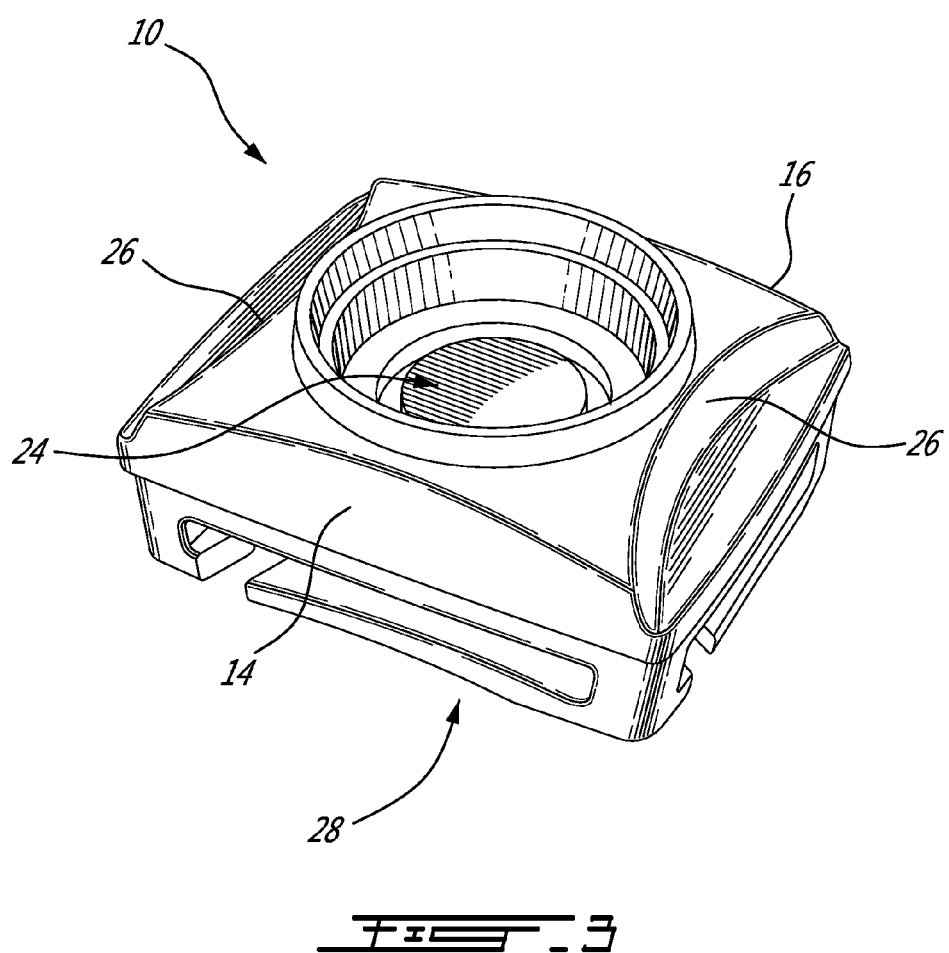

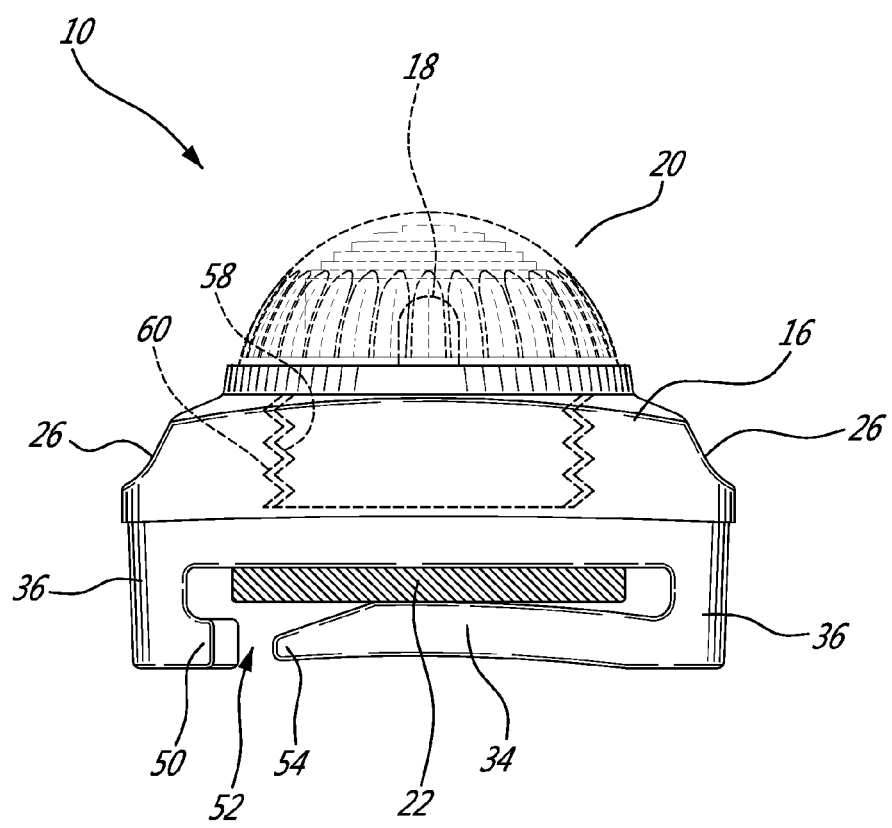

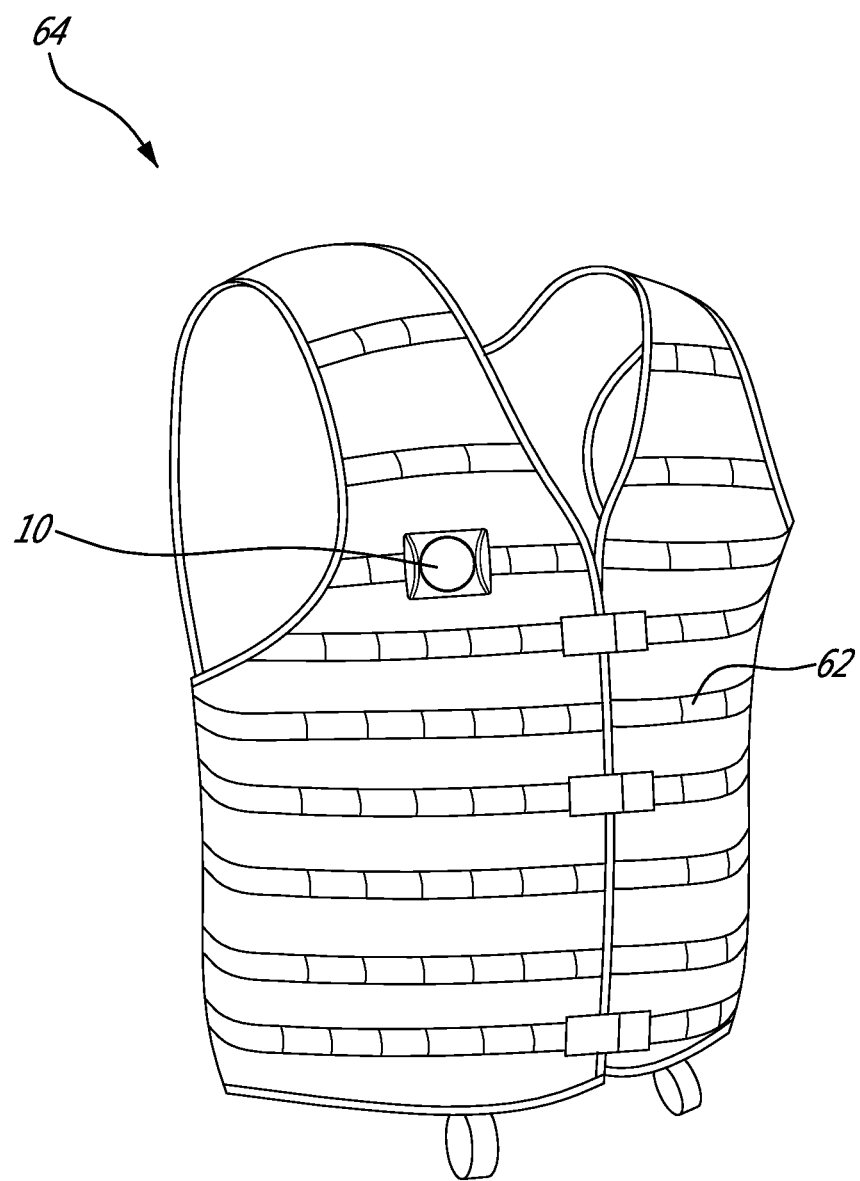

COLLAR MOUNT AND LIGHT

CROSS REFERENCE TO RELATED APPLICATIONS

This application claims benefit, under 35 U.S.C. §119(e), of U.S. provisional application Ser. No. 61/617,761, filed on Mar. 30, 2012. All documents above are incorporated herein in their entirety by reference.

FIELD OF THE INVENTION

The present invention relates to a mount and light for locking attachment to a band or strap of material. In particular, the present invention relates to a clipping type mount for rotatable attachment of a light to two differently sized bands.

BACKGROUND OF THE INVENTION

Attachment devices using a clip to secure an object to a band, such as a belt, strap, or collar, are known in the art. Such devices generally comprise a resiliently biased clip designed to slideably engage and confine a band to within an area defined between the clip and a clip body by either restricting passage of the band from this area or by the application of a friction force by the clip to the band such that the band is wedged between the clip body and clip. These conventional type spring biased clips are designed so that a user is able to rapidly remove the clip from the band with a pulling force exerted on the clip in a direction away from the band or by activating a lever arrangement that causes the clip to become unbiased so that the band is released. However, despite the simplicity of these devices, a drawback is that they are susceptible to disengaging from the band upon a sufficient application of force, for instance from shock or rapid movement.

To overcome this drawback, attachment devices comprising a locking engagement clip which completely encompasses or locks the band into place to prevent such disengagement are generally known. However, a drawback of such attachment devices is that they are complicated and require a precise manipulation of the locking means to engage and disengage the device from a band, or require threading the collar through a loop which may be difficult since many collars have buckles and the like prohibiting such threading.

Consequently, there exists a need for a mount support for mounting an object to a band, which uses a simple clipping and locking arrangement.

SUMMARY OF THE INVENTION

In order to address the above and other drawbacks, there is provided a light for mounting along a length of a strap. The light comprises a generally rectangular body, a light source mounted to the body on a first surface, first and second pairs of strap retaining members, each of the members comprising a foot portion and a flexible elongate portion, wherein the foot portion of each of the first pair of members is attached to a second surface of the body at a respective one of a first pair of opposite corners, the first pair of flexible elongate portions substantially opposed and each defining a respective one of a first pair of strap receiving slots between the body and the flexible elongate portion, wherein the foot portion of each of the second pair of members is attached to a second surface of the body at a respective one of a second pair of opposite corners, the second pair of flexible elongate portions substantially opposed and each defining a respective one of a second pair of strap receiving slots between the body and the flexible elongate portion, wherein the first pair of strap receiving slots are wider than the second pair of strap receiving slots, thereby allowing the first pair of slots to receive a wider strap than the second pair of slots, wherein a free end of each of the flexible elongate portions of the first pair of members defines a gap with a respective one of the foot portions of the second pair of strap retaining members and a free end of each of the flexible elongate portions of the second pair of members defines a gap with a respective one of the foot portions of the first pair of strap retaining members, the gaps allowing a strap to be inserted into a respective one of the slots along a length of the strap.

BRIEF DESCRIPTION OF THE DRAWINGS

FIG. 1 is a side view of a light mounted to a band, such as a dog collar, via a mounting support in accordance with an illustrative embodiment of the present invention;

FIG. 2 is a top plan view of a mounting support and a light mounted to the dog collar of FIG. 1;

FIG. 3 is a raised perspective view of a mounting support with the lens removed in accordance with an illustrative embodiment of the present invention;

FIG. 8 is a sectional view of the mounting support mounted to the dog collar of FIG. 2 taken along the line 8-8 thereof; and FIG. 9 is a perspective view of a MOdular Lightweight Load-carrying Equipment (MOLLE) type tactical vest with Pouch Attachment Ladder System (PALS) web straps showing the mounting support and light of FIG. 3 mounted to a web strap.

DETAILED DESCRIPTION OF THE ILLUSTRATIVE EMBODIMENTS

Figure 4:
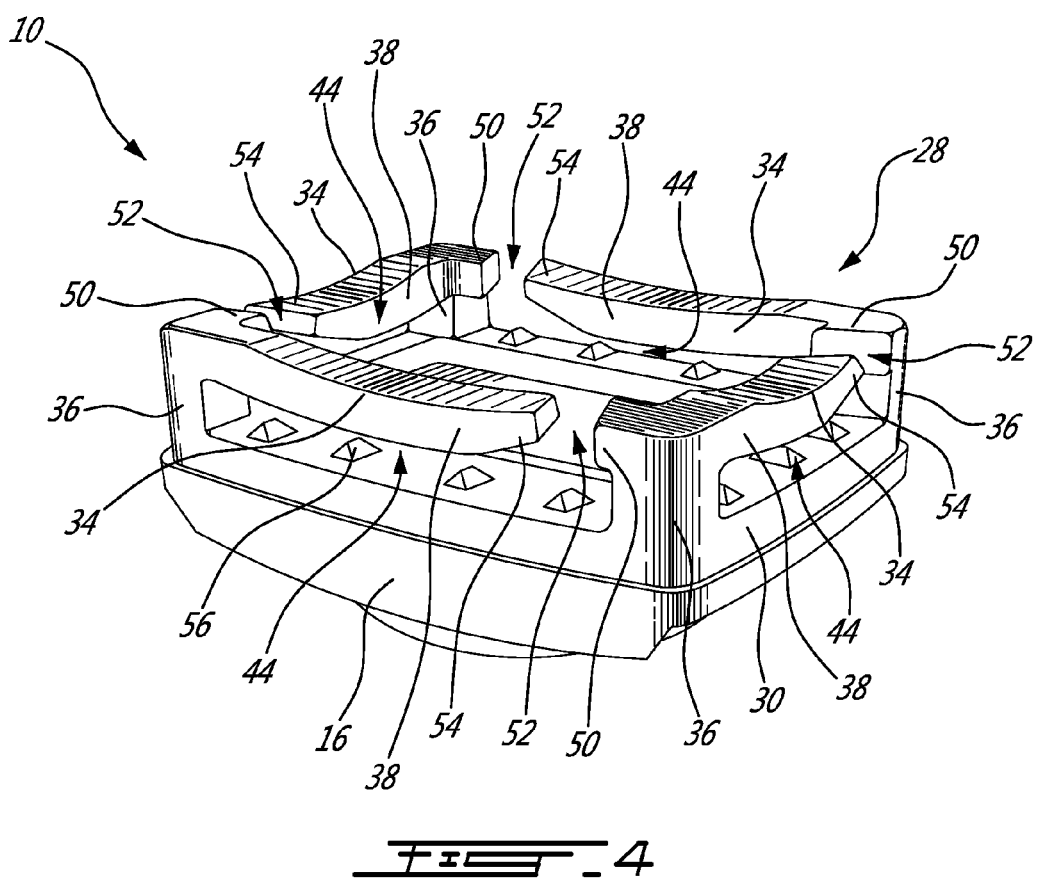
FIG. 4 is a perspective view of a bottom of the mounting support of FIG. 3.

Referring now to FIGS. 1 and 2, a mounting support and light in accordance with an illustrative embodiment of the present invention will now be described. The mounting support, generally referred to using the reference numeral 10 is used for mounting an object 12, either integrally, fixedly, adjustably or otherwise coupled thereto, to a mounting surface 14 of a mount body 16. In the illustrative embodiment figured, the object 12 is a light source 18, such as an LED, comprising a base portion of which is affixed to the mounting body 16 and a protective lens 20 covering the light source 18. The lens 20 is illustratively fabricated from a transparent material or a translucent colored material such as polycarbonate.

Still referring to FIGS. 1 and 2, the mounting support 10 is illustratively used to mount the light source 18 to a dog collar 22 comprising a width and a thickness. As will be discussed further herein below, the mounting support 10 provides a universal device for mounting various objects 12, such as the light source 18, or other type of light emitting beacon, transponder, identification tag, or the like, to a flat band like structure, including their supporting batteries and electronics (not shown).

Now referring to FIG. 3 in addition to FIGS. 1 and 2, the mounting support 10 illustratively comprises the mount body 16 fabricated from a rugged material such as plastic. The mount body 16 comprises the mounting surface 14 to which the light source 18 and lens 20 is coupled via any type of fastening means, such as threads and adhesives and the like. In accordance with the illustrated embodiment, there is provided a hollow receptacle 24 formed within the mount body 16 in which the lens 20 is matingly received. A pair of indentations 26 formed into the sides of the mount body 16 are further provided so as to form a gripping structure to permit a user to exert a rotational force on the mounting support 10. The mount body 16 may alternatively or additionally comprise another form of gripping structure on the surface of the mount body 16, such as a coating or raised members or other indentations, so as to provide a friction surface against which a user's hand or fingers may apply the rotational force.

Figure 5:
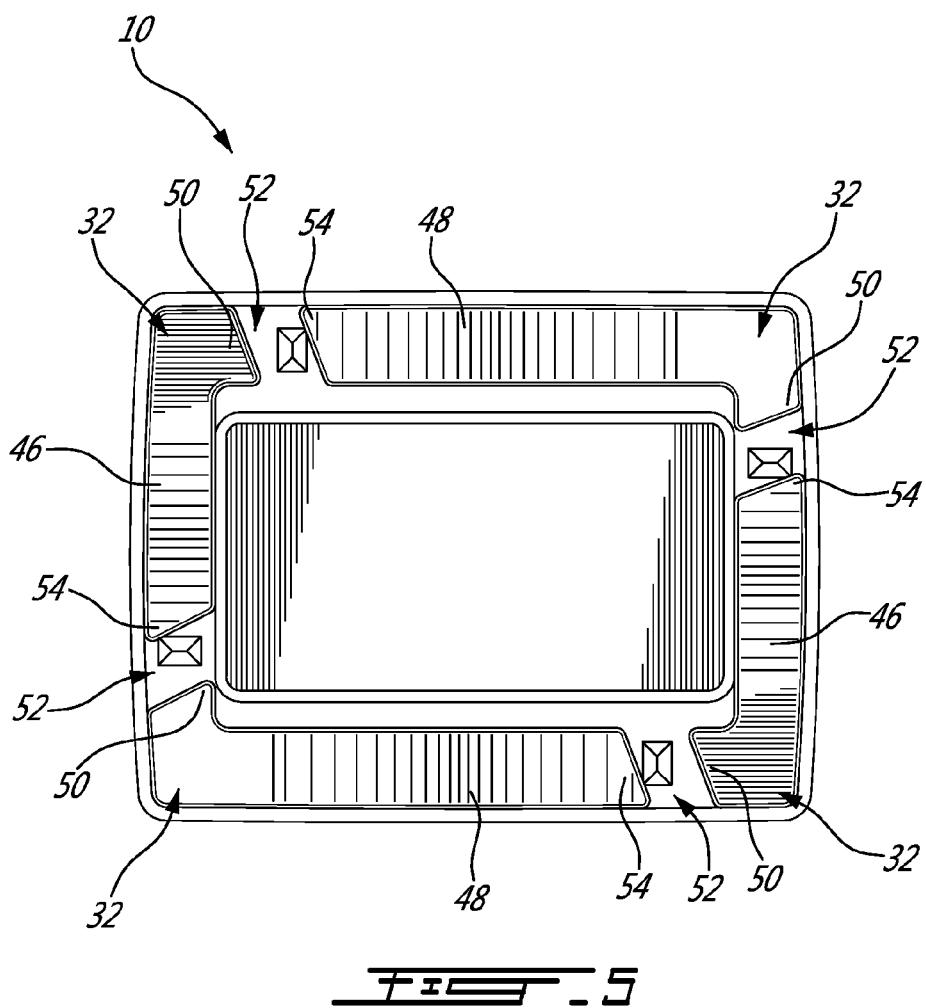
FIG. 5 is a bottom plan view of the mounting support of FIG. 3.

Now referring to FIGS. 4 and 5, the mount body 16 further comprises an underside 28 comprising a raised peripheral edge 30 running along the circumference of the underside 28. In accordance with the illustrative embodiment of the present invention, the mount body 16 is of rectangular shape and comprises four corners as in 32. There is further provided two pairs of opposed and slightly flexible collar retaining members as in 34, each comprising a foot portion 36 and an elongate slight flexible member 38 comprising a free end 40 extending from their respective foot portions 36 at each of the corners as in 32 of the raised peripheral edge 30 and which run substantially parallel thereto. In this manner, raised peripheral edge 30 and respective ones of the collar retaining members as in 34 define respective slots as in 44 configured for receiving the collar 22. In this regard, each collar retaining member as in 34 is oriented such that it spans substantially parallel with the peripheral edge 30 defined between its respective corner as in 32 and that of an adjacent respective corner as in 32.

Still referring to FIG. 4 and FIG. 5, the collar retaining members as in 34 are arranged in pairs and the raised peripheral edge 30 define the four slots as in 44 having a width and height into which the width and thickness of the collar 22 is able to be received. In particular, there is provided a first pair of slots as in 44 defined by the peripheral edge 30 and its respective first pair of opposed clips as in 46 for receiving a collar 22 having a width and a thickness, and a second pair of slots as in 44 defined by the peripheral edge 30 and its respective second pair of opposed clips as in 48 for receiving a collar 22 having a larger width and/or thickness. In particular, the slots as in 44 are substantially dimensioned to the width and thickness of the dog collar 22 that is to be accepted therein in a manner that the peripheral edges of the collar 22 abut the protrusions as in 42 between adjacent corners such that lateral movement of the collar 22 is restricted. In accordance with the illustrative embodiment of the present invention, a first pair of the slots as in 44 defined by the peripheral edge 30 and its respective first pair of opposed clips as in 46 define a width that is smaller than a second pair of the slots as in 44 defined by the peripheral edge 30 and its respective second pair of opposed clips as in 48 so that the mounting support 10 is able to accommodate two differently sized collars 22.

There is further provided four tabs as in 50, one of which extends from each protrusion 42 in a direction perpendicular to the collar retaining members as in 40 such that a gap/passage 52 is formed between any tab as in 50 and a free end 40 of the flexible member 38 of a respective adjacent collar retaining member as in 34. These tabs as in 50 provide a lip to help retain the collar 22 within a slot as in 44 once it has been received therein.

Still referring to FIG. 4 and FIG. 5, the collar retaining members as in 34 although slightly flexible, are generally resiliently biased such that they remain above the raised peripheral edges 30 of the mount body 16. The resilience of the collar retaining members as in 34 is a consequence of the elasticity and strength of the material of its construction, for instance from plastic or the like. The elongate flexible members 38 of the collar retaining members as in 34 are lightly curved and comprise a lightly concave arcuate structure which arcs substantially towards the middle point of the peripheral edges 30 defined between any two adjacent corners. This facilitates the deflection and maintenance of the dog collar 22 within the slots as in 44 and provides a good gripping force on the strap once received within the slots as in 44 as the height of the slot decreases towards its center. In accordance with another illustrative embodiment, a tip 54 of each of the collar retaining members as in 34 is sloped to facilitate the deflection of a collar retaining member as in 34 as the dog collar 22 slideably engages therewith. In particular, as the width of the collar 22 slideably engages a sloped tip as in 54 of a collar retaining member as in 34, the dog collar 22 deflects the respective collar retaining members as in 34 from its usual biased state to a tensed state. In addition, the tips as in 54 are further angled to match an angle of a respective tab as in 50 so as to define the respective passages as in 52, thereby facilitating passage of the collar 22 there through. The raised peripheral edge 30 may further comprise various surface materials or coatings to improve the mounting retention of the mounting support 10 on a given collar 22 and to prevent sliding of the collar 22 along its length. Such materials and coatings may include for example slip-resistant materials (e.g. rubbers, compressible pads, etc.). In accordance with the present illustrative embodiment, there is provided a series of raised projections 56 designed to engage the collar 22 when received within the recesses.

Still referring to FIG. 5, as discussed above the elongate members 38 of the collar retaining members as in 34 of the first pair of collar retaining members 46 are respectively positioned such that they are opposite and parallel to one another and define passages as in 52. The passages as in 52 for a given pair of collar retaining members as in 34 are diametrically opposed, and are spaced apart such that width of the collar 22 width is able to fit there between. A similar arrangement of the second pair of collar retaining members 48 is also provided to accommodate the width of a larger sized collar 22.

Now referring to FIGS. 6 and 7, the attaching operation of the mounting support 10 to a small dog collar 22 will now be described. The mounting support 10 is positioned in an unlocked manner such that each collar retaining member as in 34 first of the pair of collar retaining members 46 is parallel to the peripheral edge of the collar 22. A rotational force applied to the mounting support 10 by a user grasping the mounting body 16 at the indentations points 26 forces the sloped tips as in 55 of each of the respective collar retaining members as in 34 to engage the collar 22 thereby forcing the collar retaining members as in 34 from their biased to a tensed state as the collar 22 slideably passes through the passages as in 52 into the respective slots as in 44. As the mounting support 10 substantially reaches a 90 degree rotational position relative to the unlocked position, the collar 22 is received into the respective slots as in 44 and secured therein.

Figure 6:
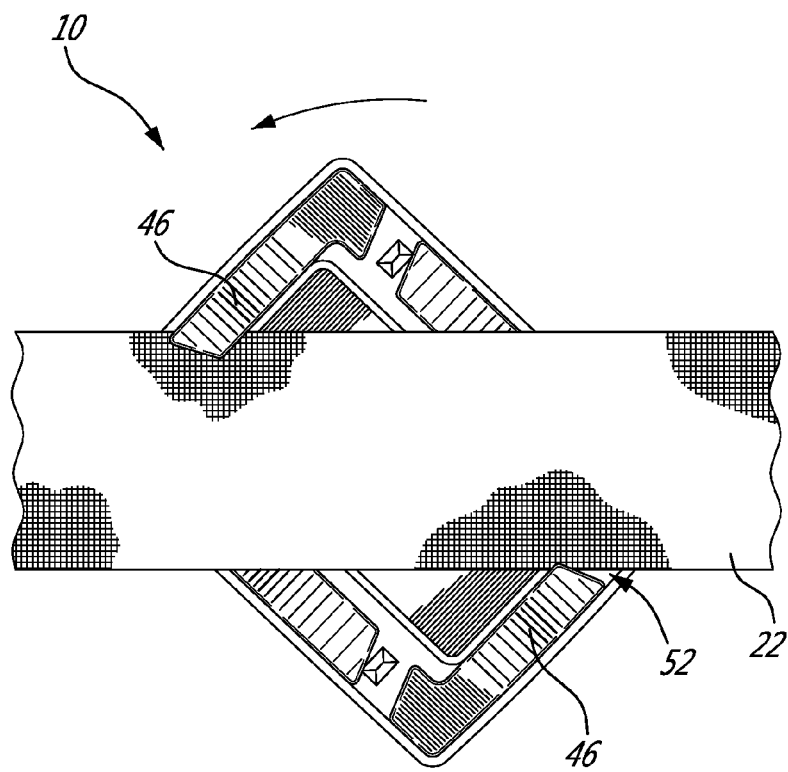
FIG. 6 is a bottom view of the mounting support of FIG. 1 being mounted on a small dog collar.
Figure 7:
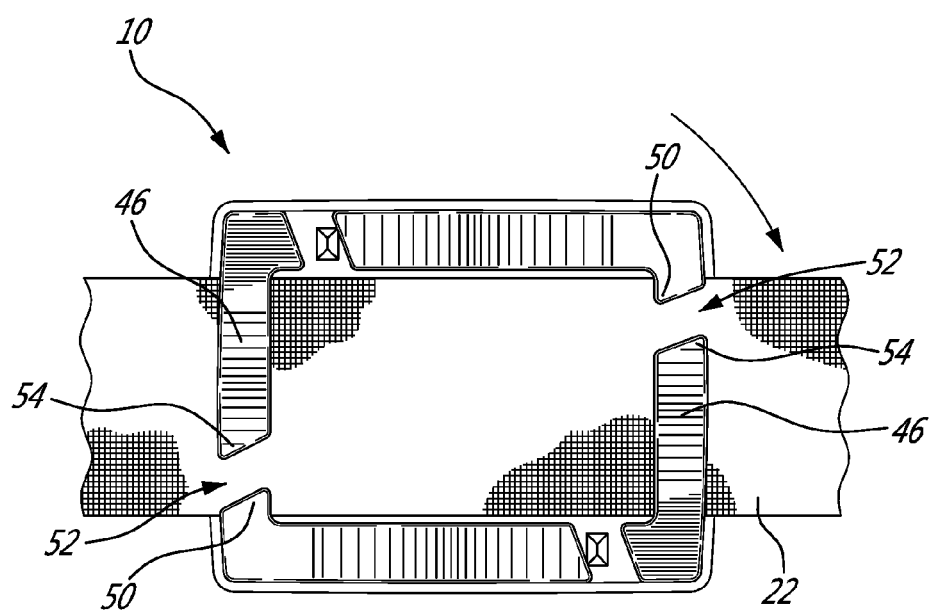
FIG. 7 is a bottom view of the mounting support of FIG. 1 mounted on the small dog collar.

Now referring to FIG. 8, in addition to FIGS. 6 and 7, when the mounting support 10 is in a locked position about a collar 22, the collar will be retained within the slots as in 44 by a clamping force exerted by the collar retaining members as in 34 on the collar 22 itself and by the adjacent protrusions 42 which restricts the lateral movement of the collar 22 and by the protruding tabs as in 50 which act to prohibit the edge of the collar 22 from passing through the respective passages as in 52. Once in the locked position, the collar 22 is prevented from becoming disengaged with the mounting support 10 by a force applied in a direction perpendicular to the edge of the collar 22 by the protrusions 42 and its movement is further restricted by a force applied parallel to the edge of the collar 22 by the clamping force exerted by the respective pair of collar retaining members as in 34 onto the collar 22 and by the series of raised projections 56 which engage the material of the collar 22. To disengage or unlock the mounting support 10 from the collar 22, a rotational force is applied to the supporting mount 10 in a direction opposite to the rotational force required to lock it. Upon application of such a rotational force, the collar 22 will force the respective pair of collar retaining members as in 34 to a tensed state such that the collar 22 is able to be disengaged from the respective slots as in 44. A slight manipulation of the mounting support 10 may be required to disengage the collar 22 from the tabs as in 50 such that the collar 22 is able to pass through the passages as in 52. Once the collar 22 is substantially perpendicular to respective pair of collar retaining members as in 34 the mounting support 10 can be removed from the proximity of the collar 10.

Accordingly, the mounting support 10 can be quickly affixed to the collar 22 in a secure and locked manner by a twisting motion and removed from a locked engagement by a simple opposite twisting motion and without the need to remove the collar 22 from the dog in order to thread the collar 22 through the respective pair of collar retaining members as in 34. The mounting support 10 can be attached and detached to a larger collar 22 by placing the other pair of collar retaining members as in 34 parallel to the edges of the collar 22 and proceeding with the same locking and unlocking sequence as described hereinabove.

Still referring to FIG. 8, as discussed above the hollow lens 20 is illustratively comprised of a threaded outer surface 58 which is engaged by a corresponding threaded inner surface 60 of the mount body 16. This conveniently allows the lens 20 to be mounted and removed from the mount body 16 (for example to change batteries or the like) by turning the lens 20 in a clockwise or counter clockwise direction. The rotating action can also be used to engage and disengage a switch (not shown) for example for illuminating or extinguishing the light.

Referring now to FIG. 9, while the present invention has been illustrated in the context of a dog collar 22, a person of skill in the art will understand that numerous other examples of mounting surface shapes and forms may be considered for attaching a mounting support 10 thereto. In particular, applications where a light source 18 is needed to be affixed to a band like structure such as to a belt, a strap bag, a flat rope or surfaces and structures of different shapes and forms may be considered. According to an exemplary embodiment, a mounting support 10 is mounted to one of the PALS web straps 62 of a MOLLE type military tactical vest 64 which ordinarily allows for the attachment of various modular ordinances. Additionally, the mounting support 10 may engage the goggle straps of a military helmet, life jacket straps, purse or shoulder bag straps or handbag straps, nap sack straps, or the like. Generally, the present invention is mountable to any band like structure such as a belt, or a strap where it is impossible to thread the band at one of its ends or when a quick locking attachment is required. Also, while the mounting support has been illustrated as manufactured from plastic, various other materials such as metals, and composites, or a combination thereof may be employed. Although the supporting mount 10 has been described in the context of a rectangular shape mount body 16, other shapes such as a square or a round or triangular body may be employed. Of note, the dimensions of the mount body 16 in combination with the dimensions of the clips will act to limit the mounting of the mounting support 10 to differently sized collars 22.

While this invention has been described with reference to the illustrative embodiments, this description is not intended to be construed to a limiting sense. Various modifications or combinations of the illustrative embodiment of the invention will be apparent to persons skilled in the art upon reference to the description. It is therefore intended that the described invention encompass any such modifications or embodiments.

I claim:

1. A light for mounting along a length of a strap, comprising:
   a generally rectangular body;
   a light source mounted to said body on a first surface;
   first and second pairs of strap retaining members, each of said members comprising a foot portion and a flexible elongate portion;
   wherein said foot portion of each of said first pair of members is attached to a second surface of said body at a respective one of a first pair of opposite corners, said first pair of flexible elongate portions substantially opposed and each defining a respective one of a first pair of strap receiving slots between said body and said flexible elongate portion;
   wherein said foot portion of each of said second pair of members is attached to a second surface of said body at a respective one of a second pair of opposite corners, said second pair of flexible elongate portions substantially opposed and each defining a respective one of a second pair of strap receiving slots between said body and said flexible elongate portion;
   wherein said first pair of strap receiving slots are wider than said second pair of strap receiving slots, thereby allowing said first pair of slots to receive a wider strap than said second pair of slots;
   wherein a free end of each of said flexible elongate portions of said first pair of members defines a gap with a respective one of said foot portions of said second pair of strap retaining members and a free end of each of said flexible elongate portions of said second pair of members defines a gap with a respective one of said foot portions of said first pair of strap retaining members, said gaps allowing a strap to be inserted into a respective one of said slots along a length of said strap.

2. The light of claim 1, wherein each of said foot portions comprises a tab such that said free end of each of said flexible elongate portions of said first pair of members defines said gap with said tab of said respective one of said foot portions of said second pair of strap retaining members and said free end of each of said flexible elongate portions of said second pair of members defines said gap with a tab of said respective one of said foot portions of said first pair of strap retaining members.

3. The light of claim 1, wherein each of said slots comprises a plurality of strap engaging projections disposed therein.

4. The light of claim 1, wherein the strap is inserted into each of said slots via a respective gap.

5. The light of claim 1, wherein each of said flexible elongate portions is curved such that, for each of said flexible elongate portions, a height of a respective one of said slots decreases towards a center thereof.

6. The light of claim 1, wherein said light source comprises an LED.

7. The light of claim 1, wherein a width of each of said gaps is substantially the same as a height of said slots.

8. The light of claim 1, wherein said body is substantially hollow and configured for receiving a battery therein.

9. The light of claim 8, wherein said body comprises an opening in said first surface for accessing said battery, said opening configured for receiving a translucent hollow lens therein.

10. The light of claim 9, wherein said opening comprises a threaded inner surface, said hollow lens comprises a complementary threaded outer surface, and further wherein said lens is received within said opening by screwing said lens into said opening.

* * * * *